United States Patent [19]
Mori

[11] Patent Number: 4,932,485
[45] Date of Patent: Jun. 12, 1990

[54] ELECTRONIC SCALE DEVICE WITH PRINTER FOR RETAIL STORES

[75] Inventor: Kunio Mori, Tokyo, Japan

[73] Assignee: Teraoka Seiko Co., Ltd., Tokyo, Japan

[21] Appl. No.: 414,460

[22] Filed: Sep. 29, 1989

[30] Foreign Application Priority Data

Sep. 30, 1988 [JP] Japan ................. 63-246922

[51] Int. Cl.$^5$ ................ G01G 23/22; G07G 1/12; G06F 15/20
[52] U.S. Cl. ................ 177/25.15; 177/245; 364/405; 364/464.01
[58] Field of Search ............ 177/25.15, 245; 364/464.01, 466, 405, 406

[56] References Cited

U.S. PATENT DOCUMENTS 4,229,794 10/1980 Foster ................. 177/25.15 X
4,377,214 3/1983 Hansen et al. ............ 177/25.15

FOREIGN PATENT DOCUMENTS 0052771 7/1980 European Pat. Off. ......... 177/25.15
2027912 2/1980 United Kingdom ............ 177/25.15

Primary Examiner—George H. Miller, Jr.
Attorney, Agent, or Firm—Oblon, Spivak, McCelland, Maier & Neustadt

[57] ABSTRACT

An electronic scale device which measures weight of an item and calculates a price of the item by multiplying the weight of the item by a unit price of the item, and has printing device for printing out item data including the weight of the item and the price of the item on a label paper or a receipt paper, the electronic scale device consisting of:

(a) a memory device for storing member-customer data including customer name, customer address, and total amount eligible for rebate based on total purchase amount, the-member-customer data being read from the memory device by imputting customer-identification data;

(b) a calculating device for calculating rebate data including rebate amount or a number of points for rebate, based on the total amount eligible for rebate; and (c) a printer control device for controlling the printing device to print out at least one data set including the customer name and the customer address and a second data set including the rebate data on a receipt paper or a label paper by device of the printing device.

14 Claims, 7 Drawing Sheets

27e

| CALL NUMBER | CUSTOMER ADDRESS | CUSTOMER NAME | TOTAL PURCHASE AMOUNT | ELIGIBLE FOR REBATE AMOUNT | NUMBER OF POINTS | REBATE |
|---|---|---|---|---|---|---|
| | | | | | | |
| 8,900 | 1-2-3, Kugahara Ota-ku,··· | TARO YAMADA | -------- | 15,267 | -------- | 153 |
| | | | | | | |

| CALL NUMBER | CUSTOMER ADDRESS | CUSTOMER NAME | TOTAL PURCHASE AMOUNT | ELIGIBLE FOR REBATE AMOUNT | NUMBER OF POINTS | REBATE |
|---|---|---|---|---|---|---|
| ------- | ------- | ----- | ------- | ------- | ------- | ------- |
| 8,900 | 1-2-3,Kugahara Ota-ku,... | TARO YAMADA | ------- | 15,267 | ------- | 153 |
| | ------- | ------- | | ------- | | |

ELECTRONIC SCALE DEVICE WITH PRINTER FOR RETAIL STORES

BACKGROUND OF THE INVENTION

1. Field of the Invention

The present invention relates to an electronic scale device which incorporates a printing function for printing out information such as item weight, price, and the like.

2. Related Art

Recently, electronic scales having electronic cash register functions in addition to the conventional functions of electronic scales such as measuring weight, calculating, displaying, printing prices, and the like, have come into wide use in supermarkets and stores. This type of electronic scale is used instead of the cash register (referred to as "ECR" hereafter) in retail stores (butcher shops and the like) where product weight is dealt with.

In order to attract new customers, while at the same time maintaining regular customers, ECR or point-of-sale (POS) systems have been developed which have a customer information management system function for printing discount coupons in accordance with each customer's total purchase amount, and have been adopted in many stores. Recently, this type of system has become very popular. In this customer information management system, membership cards are printed for member customers. If a member purchases items using the membership card, discount coupons corresponding to the total purchase amount recorded during a fixed period are mailed to the member. Later, when the customer presents the discount coupons to the store clerk, a discount or a refund (referred to as rebate hereafter) is given based on the value of the discount coupons.

When the conventional customer-control system is adopted, however, work such as writing customer addresses for mailing at fixed periods, and printing out service coupons corresponding to the total purchase amount, is necessary. In the ECR or the POS system, the work mentioned above is conducted by utilizing the standard printer connected to a computer installed as a store controller. Printers designed for printing address labels for customer information management systems have been developed and are already in use in some stores.

The electronic scales described at the beginning of this section have been developed so as to have a customer information management system function as same as the ECR and the POS system.

With the standard electronic scales having a customer information management system function, work such as writing customer addresses for mailing, and printing out service coupons corresponding to the total purchase amount, is necessary. The work is generally carried out manually because the number of customers is much less than that of customers of the ECR or the POS system, and so using the expensive computer above mentioned or the printer specialized for printing address-labels is not practical. Therefore, an electronic scale device with a standard printer or an address-label printer connected to a store controlled computer has not yet been introduced.

SUMMARY OF THE INVENTION

It is an object of the present invention to provide an electronic scale device which prints out address-labels having discount information such as rebate data, and the like, without having to install a standard printer or a standard address-label printer.

According to the invention, an electronic scale device is provided which measures weight of an item and calculates a price of the item by multiplying the weight of the item by a unit price of the item, and has printing device for printing out item data including the weight of the item and the price of the item on a label paper or a receipt paper, the electronic scale device consisting of:

(a) a memory device for storing member-customer data including customer name, customer address, and total amount eligible for rebate based on total purchase amount, the member-customer data being read from the memory device by inputting customer-identification data;

(b) a calculating device for calculating rebate data including rebate amount or a number of points for rebate, based on the total amount eligible for rebate; and (c) a printer control device for controlling the printing device to print out at least one data set including the customer name and the customer address and a second data set including the rebate data on a receipt paper or a label paper by device for the printing device.

In the electronic scale device according to the present invention, an address label including customer service information such as rebate data, and the like, is automatically printed on a label paper or a receipt paper by utilizing the printing device hitherto used for item data such as item price, item weight, and the like.

DETAILED DESCRIPTION OF THE PREFERRED EMBODIMENT

Description of an electronic scale device according to an embodiment of the present invention will be given in conjunction with the figures.

Figure 1:
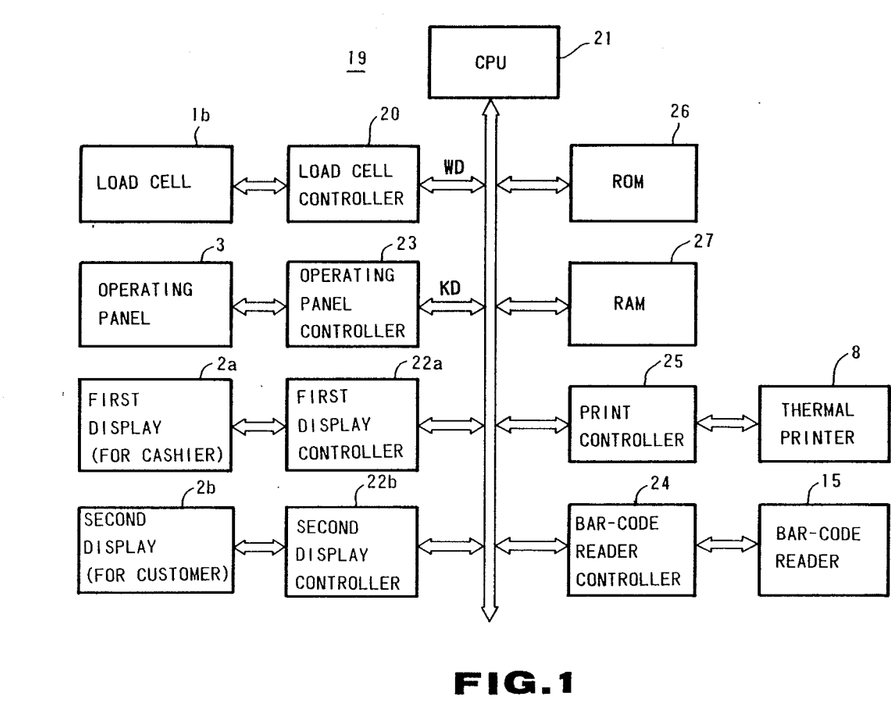
FIG. 1 is a block diagram showing an electronic configuration of an electronic scale device according to an embodiment of the present invention.
Figure 2:
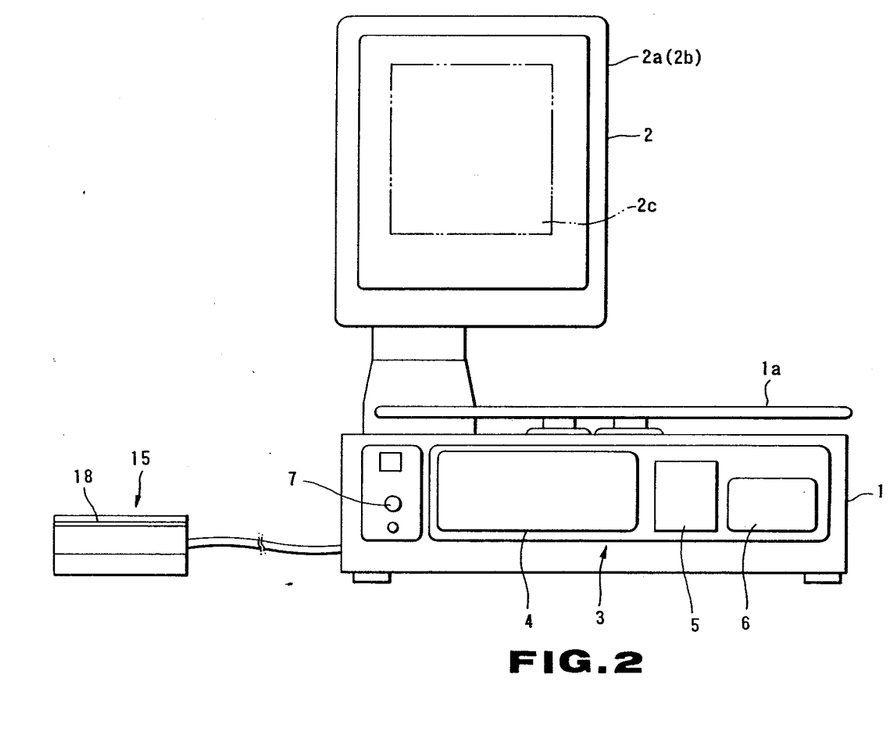
FIG. 2 is a front elevation view showing the outer appearance of the embodiment of this invention.
Figure 3:
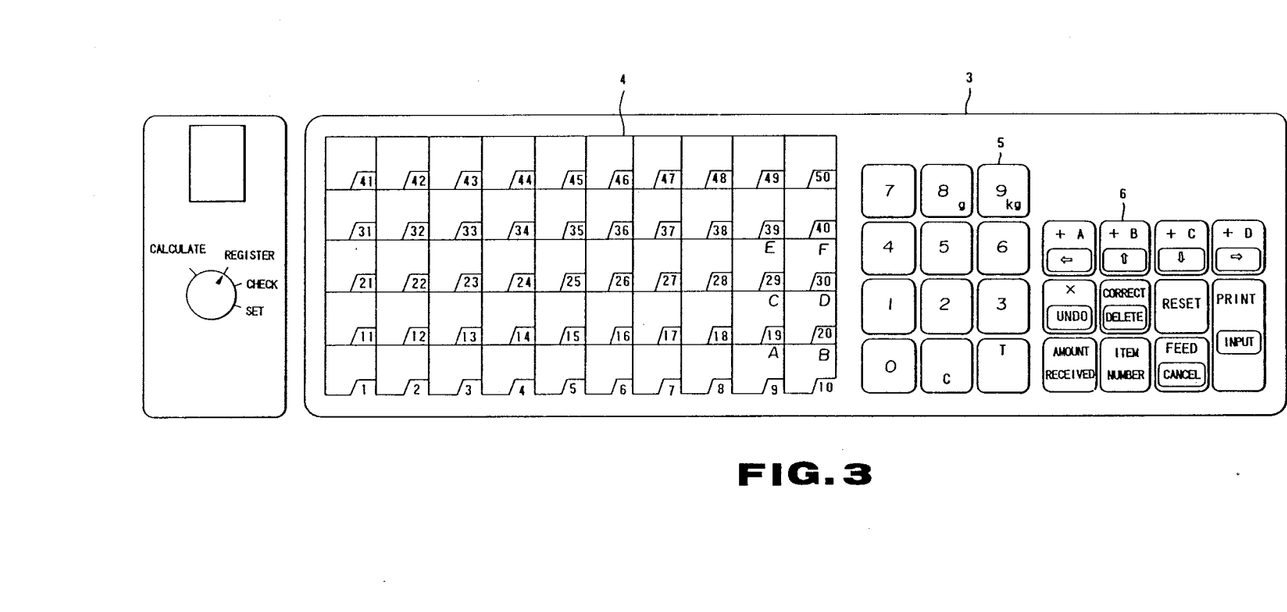
FIG. 3 is a front elevation view showing an operating panel of the embodiment of this invention.

FIG. 1 is a block diagram showing an electronic configuration of an electronic scale device according to an embodiment of the present invention. FIG. 2 is a front elevation view of the electronic scale device and FIG. 3 is a front elevation view of an operating panel of the electronic scale device.

Figure 4:
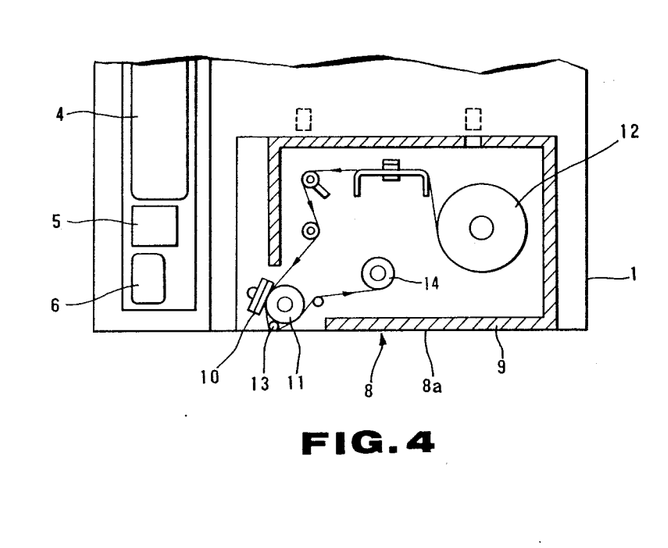
FIG. 4 is a cross-sectional plan view of an example of a thermal printer used in the embodiment.
Figure 5:
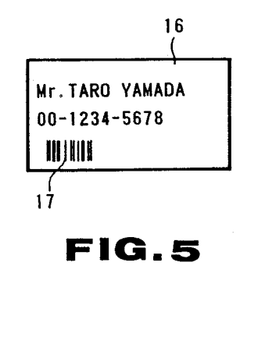
FIG. 5 is a front view of the bar-code card used in the embodiment.

First, a mechanical construction of the embodiment will be explained. In FIG. 2, a scale plate 1a, which is plate-shaped, is mounted on a scale body 1. When an object is put on the scale plate 1a, a scale signal is outputted from a load cell 1b shown in FIG. 1. At a rear of the scale body 1, a double display 2 is provided vertically to the scale body 1. The double display 2 has a first display 2a for the store clerk on a front face, and a second display 2b for the customer on a rear face. Each of the first display 2a and the second display 2b consists of a plasma display having a display area 2c of 256×256 dots. On display area 2c, item names, item weight, item prices, the total amount of a purchase, and the like, can be displayed. An operating panel 3 is angled and mounted to the front face of the scale body 1 so that the store clerk can easily operate the operating panel 3. As shown in FIG. 3, the operating panel 3 is provided with a pad of preset keys 4, a keypad 5, function keys 6, and a key switch 7 for changing modes. The pad of preset keys 4 consists of 50 (5 rows×10 columns) keys shown in FIG. 3, and is for directly recalling PLU (price look-up) data such as the stored unit price (price per unit weight), and the like, in accordance with the PLU number. The keypad 5 may be used for inputting many kinds of data and the function keys 6 not only have functions which is needed in selling by measure but also have functions for moving cursors in the display 2 and correcting data displayed in the display 2. The key switch 7 is for changing the modes such as setting, checking, registering, and calculating. A clear key for clearing the input data, and a tare key for inputting the weight of a container (such as a paper bag, a plastic dish, etc.) are added to the keypad 5. Inside the scale body 1, a thermal printer 8 for printing out labels and receipts is provided. The thermal printer 8 comprises a thermal head for dot printing, a shift register for storing single lines of dot data and supplying the data to the thermal head, and a stepping motor for feeding label paper or receipt paper one step after each line of dot data is printed. Required symbols, numbers, and figures are printed out by the thermal printer 8. The thermal printer 8 has a cassette insert 8a, and a label cassette containing label papers in a roll or a receipt cassette containing receipt paper in a roll, is inserted therein. FIG. 4 is a cross-sectional plan view of the cassette insert 8a of the thermal printer 8, with a label cassette 9 inserted into the cassette insert 8a as an example. In FIG. 4, a thermal head 10 thermal-prints label papers while feeding label papers 12 to a platen roller 11. When the label papers 12 pass over a dispenser 13, the printed labels are lifted off from the backing sheet and then dispensed out of the thermal printer 8, while the backing sheet is rolled onto a take-up reel 14. Such a cassette-type printer is described in U.S. Pat. No. 4,598,780 (Applicant: Teraoka Seiko Co., Ltd.). In FIG. 2, a bar-code reader 15 reads bar-code data corresponding to a bar-code when a scanning groove 18 of the bar-code reader 15 scans a printed bar-code 17 of a bar-code card 16 as shown in FIG. 5. The bar-code card 16 having the printed bar-code corresponding to the customer number is used as a membership card.

Figure 6:
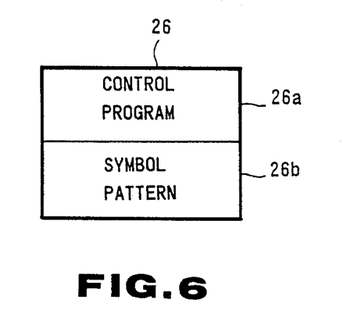
FIG. 6 is a schematic diagram of the ROM (read only memory) shown in FIG. 1.
Figure 7:
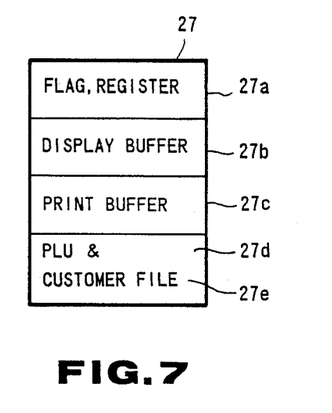
FIG. 7 is a schematic diagram of the RAM (random access memory) shown in FIG. 1.
Figure 8:
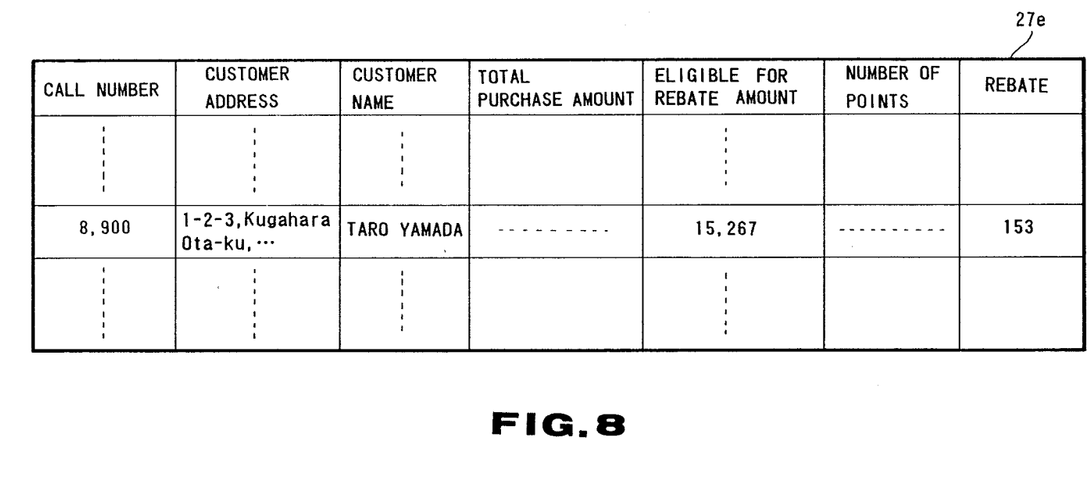
FIG. 8 shows data of the PLU (price look-up) file and the customer file in the RAM memory shown in FIG. 7.

Next, the electronic configuration shown in FIG. 1 will be explained. All parts mentioned above are connected to a controller 19 as shown in FIG. 1. The load cell 1b for measuring the weight of an object on the scale plate 1a is connected to a CPU (central processing unit) 21 by interposing a load-cell controller 20. Both the first display 2a and the second display 2b are connected to the CPU 21 by interposing a first display controller 22a and a second display controller 22b, respectively. The first and second display controllers 22a and 22b have display memories therein and continue to display the data of the display memories. The operating panel 3, the bar code reader 15, and the thermal printer 8 are connected to the CPU 21 by interposing an operating panel controller 23, a bar-code reader controller 24, and a print controller 25, respectively. The bar-code reader 15 is detachably connected. A ROM (read only memory) 26 and a RAM (random access memory) 27 are connected to the CPU 21. This ROM 26 includes a control program memory 26a for storing control programs to control scale processes, print processes, display processes, and the like, and a symbol pattern memory 26b for storing symbol patterns such as symbols, numbers, and the like, as shown in FIG. 6. The RAM 27 includes of a work area 27a having many kinds of flags and registers, a display buffer 27b for storing display data, a print buffer 27c for storing print data, a PLU file 27d, a customer file 27e, and the like as shown in FIG. 7. The PLU file 27d has an area for storing item data corresponding to item numbers, such as the unit price, the term of validity, the item code, the total weight, the total price, the item name to be printed on a label paper or a receipt paper, and the like. The PLU file, especially the file for printing the item name on a label paper or a receipt paper, is described in Japanese Patent Application First Publication "Kokai" No. 61-154956 (Applicant: Teraoka Seiko Co., Ltd.). The customer file 27e has an area for storing customer data each of which includes a customer name, a customer address, the total purchase amount, a price eligible for rebate, rebate, the number of points, and the like, corresponding to the customer number as shown in FIG. 8. Thus, in this embodiment, the customer file 27e has both memory area for rebate and memory area for the number of points because in the customer information management system function of the ECR or the POS system, some stores give rebate based on the total amount eligible for rebate and some stores give rebate based on the number of points at present. Therefore, either a rebate or a number of points can be selected by a select switch (not shown) according to the preference of the store. In this embodiment, a rebate is calculated based on the total purchase amount, any decimal fraction being round off, and the number of points is calculated based on the total purchase amount with any a decimal fraction sacrificed. The PLU file 27d and the customer file 27e have the same formats. That is to say, the fields of the address, the name, and the customer number in the customer file 27e, correspond to the fields of the item name to be printed on the label paper, the item name to be printed on the receipt paper, and the item number, respectively, in the item file 27d. Both the item file 27d and the customer file 27e have call numbers in order to distinguish them from each other. For example, the call numbers from 1 to 7999 are used as the item numbers for recalling the item data, and the call numbers from 8000 to 9999 are used as the customer numbers for recalling the customer data.

Figure 9:
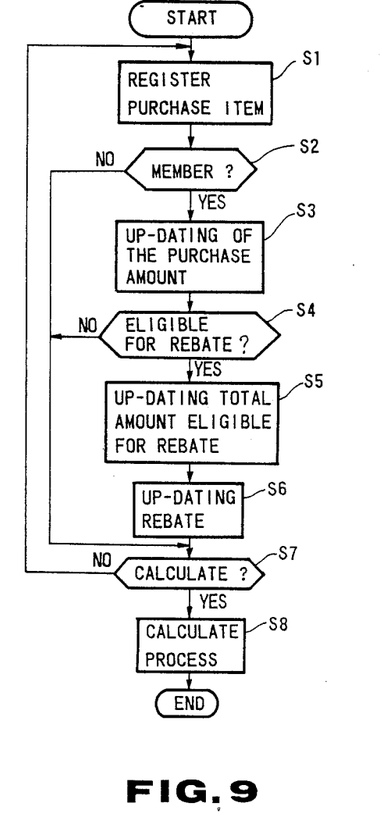
FIG. 9 is a flowchart of an item register process according to the embodiment.

Next, the rebate process used in the electronic scale device of the embodiment described above is explained in conjunction with the block diagram shown in FIG. 1 and the flowchart shown in FIG. 9.

When the electronic scale device is on standby, a customer brings several items to the store clerk and asks for a total price. The store clerk places the items on the scale plate 1a, and then pushes the appropriate keys of the preset keys 4 of the operating panel 3 to input the item number data (KD). When the items are placed on the scale plate 1a, the weight of the item is measured by the load cell 1b and weight data (WD) corresponding to the weight are outputted from the load cell controller 20. When the item data (KD) is supplied to the operating panel controller 23 by use of the preset keys 4 and then inputted into the CPU 21, the process of Step S1, which follows commences.

Step S1 (purchased-item register process)

The CPU 21 reads the item data such as item name, unit price, the term of validity, and the like, corresponding to the item number data KD from the PLU file 27d of the RAM 27, as shown in FIG. 7, and then transmits the item data to the work area. The weight data are transmitted to the same work area. Next, the CPU 21 calculates the price of the item. If the item is of a fixed quantity, the price of the item is the price read from the PLU file 27; if the item is of a measured quantity, the CPU 21 calculates the price as equalling the weight data WD in the work area 27a multiplied by the unit data which is the unit price. Items having a fixed weight do not need to be weighed. The CPU 21 stores the calculated price data in the work area 27a and registers them in an area for totals in the PLU file 27e. The data such as the item names, weight, prices, and the like, are displayed on both the first display 2a and the second display 2b and are printed out on a receipt or a label by the thermal printer 8.

Step S2

In Step S2, the CPU 21 decides whether a customer is a member or not. Before the items to be bought by the customer are registered, the store clerk checks whether the customer is a member or not and asks the customer to present their membership card if the customer is a member. The bar-code reader 15 reads the customer number data by scanning the bar-code 17 of the membership card 16 presented by the member. The customer number data read by the bar-code reader 15 is sent from the bar-code reader controller 24 to the CPU 21. After the customer number data has been supplied to the CPU 21, the CPU 21 checks whether the data is in the customer file 27e or not. Then a flag is set if the data is found in the customer file 27e and the CPU 21 stores the customer numbers. When the flag is set, it indicates that the customer is a member, and the process proceeds to Step S3. If the flag is not set, the process proceeds to Step S7.

Step S3

The CPU 21 reads out data of the total purchase amount in the customer file 27e corresponding to each customer number. The total purchase amount is the sum of the amounts of all which has been made by the customer. The calculated price in the Step S1 is read out from the work area 27a and is added to the total purchase amount, so that the total purchase amount data in the customer file 27e is updated.

Step S4

The CPU 21 decides whether the purchased item is an item eligible for rebate or not. For example, a rebate can be decided in accordance with the total purchase amount of items eligible for rebate. In Step S4, if the item is not determined to be an item eligible for rebate, the process described in Step S7 is executed. On the other hand, if the item is determined to be an item eligible for rebate, the process proceeds to Step S5.

The determination of whether or not an item is eligible for rebate is carried out in accordance with the flags of the PLU file 27d. The PLU file 27d has a flag area corresponding to the item number to show whether the item is an item eligible for rebate or not.

Step S5

The CPU 21 reads out the data for the total amount eligible for rebate which is stored in the customer file 27e and adds the calculated price in the Step S1 (the purchase amount eligible for rebate) to the data for the total amount eligible for rebate, so that the data for the total amount eligible for rebate are updated.

Step S6

The CPU 21 executes the up-date process according to data of the up-dated total amount eligible for rebate. The CPU 21 reads out the rebate rate in the work area 27a and calculates the rebate which is the total amount eligible for rebate multiplied by the rebate rate. For example, when the total purchase amount eligible for rebate is less than 10,000 yen, the rebate rate is 0%; when the total purchase amount eligible for rebate is 10,000 yen or more but less than 20,000 yen, the rebate rate applied is 1.00%; and when the total amount eligible for rebate is 20,000 yen or more but less than 30,000 yen, the rebate rate applied is 3.00%. The CPU 21 updates the rebate price data in the customer file 27e.

Step S7 (calculation process)

When the store clerk pushes the [+] key of the function key 6, the CPU 21 returns to Step S1 after calculating the total purchase amount and storing it, and then, the processes mentioned above are repeated. There are four [+] keys above mentioned such as [+A], [+B], [+C], and [+D] because the processes can be carried out for four customers at the same time in this embodiment. When the scale process and the register process for the purchased items are finished, the store clerk pushes the [PRINT] key of the function key 6 and then, the calculation process (Step S8) is executed.

Step S8 (calculation process)

The total purchase amount which the customer has is displayed on the first and second display 2a, 2b by pushing the [PRINT] key. The customer sees the total purchase amount displayed on the second display and pays an appropriate amount of cash. After receiving the appropriate amount of cash from the customer, the store clerk inputs the amount of cash tendered by using the keypad 5, and then pushes the [AMOUNT RECEIVED] key, so that the CPU 21 executes the calculation process such as calculating change, and the like.

Figure 10:
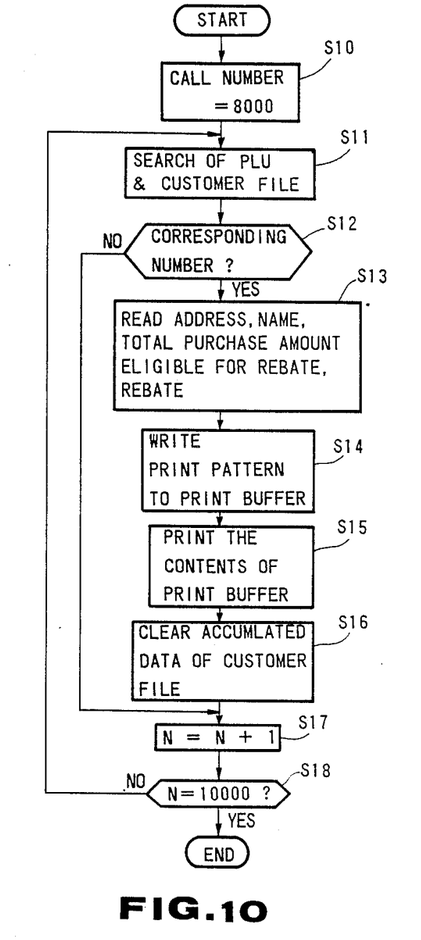
FIG. 10 is a flowchart of an address-label-print process according to the embodiment.

Next, a description will be given of an address-label printing process applied to the electronic scale device in conjunction with the flowchart shown in FIG. 10. In this process, the address-labels having rebates printed on them are printed out in the order of call numbers (customer numbers) at predetermined periods such as monthly in preparation for mailing to customers.

First, the label cassette 9 having label papers to be printed with addresses therein is inserted into the thermal printer 8 described above. The mode is changed to a check mode by the key switch 7, and the key [1] of the keypad 5 and the key [PRINT] of the function keys 6 are successively pressed, so that the process of Step S8 begins.

Step S10

The CPU 21 at first initializes the call number N contained in the work area 27a to 8000 in Step S10 because 8000 to 9999 are used for customer numbers.

Step S11

The CPU 21 searches through data corresponding to the call number N (the item number or the customer number) in the PLU file 27d and the customer file 27e.

Step S12

If the desired data are not stored in the PLU file 27d and the customer file 27e, the CPU 21 proceeds to Step S17 and N is incremented by 1. The call number N is up-dated to 8001, which is the call number 8000 plus 1. On the other hand, if the desired data is stored in the PLU file 27d and the customer file 27e, the CPU 21 proceeds to Step S13.

Step S13

The label data (the customer address data, customer name data, total amount eligible for rebate data, and rebate data, are all referred to as "label data" hereafter) are read out from the customer data corresponding to the customer number N (=8000).

Step S14

The CPU 21 proceeds to Step S14 and writes the label data in the print buffer 27c. The label data read out is converted to a symbol patterns by using the symbol patterns contained in the area 26b of the ROM 26. The CPU 21 writes the symbol patterns into the print buffer 27c so that the symbol pattern arrangement contained in the print buffer 27c is the same as the symbol pattern arrangement printed out on the label papers.

Step S15

Figure 11:
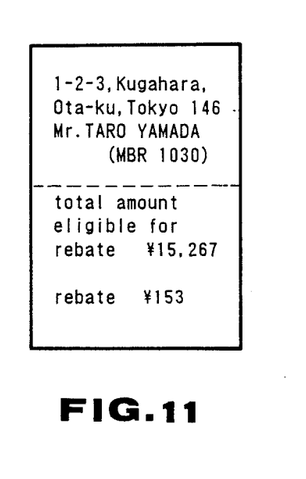
FIG. 11 is an example of a printed address-label for rebate according to the embodiment.

In Step S15, the data contained in the printer buffer 27c is successively outputted to the print controller 25, so that the label printing is carried out by the thermal printer 8. For example, the address-label having a rebate printed in a field, as shown in FIG. 11, is automatically printed out.

Step S16

Next, the CPU 21 proceeds to Step S16 and clears the sum data such as the total-amount-eligible-for-rebate data and the rebate data contained in the customer file 27e, in order to prepare for inputting new data corresponding to the next purchase.

Step S17

The CPU 21 increments the call number N (=8,000) by 1 to update the call number N to 8,001.

Step S18

The CPU 21 decides whether or not the call number N equals or exceeds 10,000. When the call number N is under 10,000, the process returns to Step S11. For example, when the call number is 8,001, the CPU 21 returns to Step S11 and the process mentioned above is repeated. On the other hand, if the call number N is 10,000 or more, the process is completed. In this case, as the largest customer number is 9,999, all of the address-labels, on which the rebates are printed will have been printed out.

The labels above mentioned can be adhered to cards which are mailed to the member-customers. In addition, the cards which the labels are adhered to may be used as discount cards for rebate.

Although, in this embodiment, the customer name, address, and the rebate data of the customer are printed on the same label paper, the customer name and address may be printed on one label paper and subsequently the rebate data of the customer may be printed on the other label paper. In this case, the label printed for customer name and address is adhered to the front face of the card and the label printed for the rebate data of the customer is adhered to the rear face of the card.

According to the electronic scale device of the present invention, an address label, on which the rebate is printed, is printed out by using the standard thermal printer 8 which prints price labels and receipts without using a specialized address printer. Therefore, work such as writing addresses by hand for mailing or printing service coupons, may be automated.

In the present invention, since both the customer file and the PLU file have the same format, they both share the same memory. In practice, a part of the memory is used for the customer file and the rest is used for the PLU file.

The present invention is not limited to the embodiment described above. For example, the following arrangements may be carried out.

Figure 12:
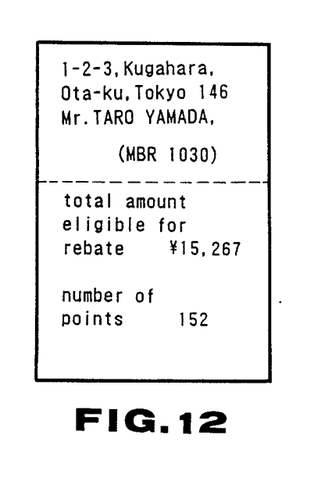
FIG. 12 is an example of a printed address-label for a number of points according to the embodiment.

Although the embodiment described above focuses on rebates, a number of points may be counted and printed on the address label as shown FIG. 12.

Furthermore, the distribution of the address labels may be flexible. For example, although the labels in the embodiment described above are printed for all the members, the labels may be printed for only the members who are eligible for rebates. In addition, labels no showing a rebate or labels containing information other than that described above may also be printed.

Although the rebates are decided according to the total purchase amount in the described embodiment, a double rebate may be applied only to women, or a one-and-a-half times rebate may be applied to a member in the month of the member's birthday, if the address labels are printed by the month.

Although the price eligible for rebate is decided according to the total purchase amount of the item prices in the embodiment described above, in case of special items, double the price of special items are added to the price eligible for rebate.

The kinds of cassettes for the label printer are not limited to the cassettes described in the embodiment in which each label is separated from the backing paper individually. For example, the label cassette for the label printer described in Japanese Utility Model Application No. 63-10768 (Applicant: Teraoka Seiko Co. Ltd.), may be applied. In this label cassette, the address labels are printed out in succession.

Although in the above-described embodiment, the rebate is calculated at the time of calculating and registering the purchased items, the rebate may be calculated when the labels are printed.

In the membership card of the above mentioned embodiment, a magnetic card or an IC card may be used as a membership card instead of the bar-code card.

Furthermore, although this embodiment discloses that the electronic scale device is used as a stand alone device, several electronic scale devices may be connected to an aggregating device for aggregating data of the electronic scale devices, or several slave electronic scale devices may be connected to a master electronic scale device. In these cases, the PLU file and the customer file mentioned above are stored in the memory device of the aggregating device or the master electronic scale device.

What is claimed is:

1. An electronic scale device which measures weight of an item and calculates a price of the item by multiplying the weight of the item by a unit price of the item, and has printing means for printing out item data including the weight of the item and the price of the item on a label paper or a receipt paper, the electronic scale device comprising:
   (a) memory means for storing member-customer data including customer name, customer address, and total amount eligible for rebate based on total purchase amount, the member-customer data being read from the memory means by inputting customer-identification data;
   (b) calculating means for calculating rebate data including rebate amount or a number of points for rebate, based on the total amount eligible for rebate; and
   (c) printer control means for controlling the printing means to print out at least one data set including the customer name and the customer address and a second data set including the rebate data on a receipt paper or a label paper by means of the printing means.

2. An electronic scale device according to claim 1, wherein the customer-identification data is a customer number which is encoded in a membership card, the electronic scale device further comprising:
   inputting means for inputting the customer number read from the membership card, and
   updating means for updating the amount eligible for rebate of the customer which is stored in the memory means on the basis of the total purchase amount of the customer.

3. An electronic scale device according to claim 2 further comprising judging means for judging whether an item is eligible for rebate or not, wherein the price of the item is not added to the amount eligible for rebate when the item is not eligible for rebate.

4. An electronic scale device according to claim 2, wherein the membership card is a bar-code card in which the customer number is recorded in the form of bar-code, and the inputting means is a bar-code reader for reading bar-code data in the bar-code card.

5. An electronic scale device according to claim 2, wherein the membership card is a magnetic card in which the customer number is written in the form of magnetic codes, and the inputting means is a magnetic card reader for reading the magnetic codes.

6. An electronic scale device according to claim 2, wherein the membership card is an integrated circuit card which stores the customer number, and the inputting means is an integrated-circuit-card reader.

7. An electronic scale device according to claim 1, wherein the printing control means supplies at least the rebate data whose value is greater than zero to the printing means so that the printing means prints out the rebate data continually.

8. An electronic scale device according to claim 7, wherein the rebate data stored in the memory means is cleared whenever after the rebate data are printed out.

9. An electronic scale device according to claim 7, wherein the printer control means controls the printing means so that the customer name, the customer address, and the rebate data are printed together on a receipt paper or a label paper by the printing means.

10. An electronic scale device according to claim 7, wherein the printer control means controls the printing means so that the customer name and the customer address are printed out on a receipt paper or a label paper, and the rebate data are printed out on another receipt paper or another label paper by means of the printing means.

11. An electronic scale device according to claim 1, wherein the memory means further stores a cumulative total of the total purchase amount.

12. An electronic scale device according to claim 11, wherein the memory means further stores item data including item name and unit price in the form of the same format as the customer data including the customer name, address, and the rebate amount.

13. An electronic scale device according to claim 1, wherein the memory means further stores item data including item name and unit price in the form of the same format as the customer data including the customer name, customer address, and the rebate amount.

14. An electronic scale device according to claim 1, wherein the printing means is provided with a cassette-type receipt/label printer.

* * * * *